United States Patent [19]

Moore

[11] 4,248,382

[45] Feb. 3, 1981

[54] SPINNER TYPE WATER WINCH

[76] Inventor: J. Jearl Moore, Consolidated-Tomoka Land Co., P.O. Box 1907, Sebring, Fla. 33870

[21] Appl. No.: 3,806

[22] Filed: Jan. 16, 1979

[51] Int. Cl.³ ............................................. B05B 3/18
[52] U.S. Cl. .................................... 239/189; 239/192
[58] Field of Search ........................... 137/344, 355.21; 242/54 R, 77, 86; 239/178, 188-192, 195-199; 188/82.6

[56] References Cited

U.S. PATENT DOCUMENTS

| | | | |
|---|---|---|---|
| 1,658,202 | 2/1928 | Jones | 239/192 X |
| 1,715,003 | 5/1929 | Hale | 188/82.6 |
| 2,013,233 | 9/1935 | Buckner | 239/189 |
| 2,905,392 | 9/1959 | Keltner | 239/192 X |
| 3,515,350 | 6/1970 | Kruse et al. | 137/344 X |
| 3,628,731 | 12/1971 | Phillips | 239/191 X |

*Primary Examiner*—Andres Kashnikow
*Attorney, Agent, or Firm*—Bernard & Brown

[57] ABSTRACT

A self-propelled water winch for spraying water over an area and moving down a predetermined path defined by a cable. The water winch includes a frame member having wheels for supporting the frame member and for allowing movement along the path defined by the cable. A rotatable nozzle member is connected to a water source under pressure sufficient to rotate the nozzle member and spray the water over a predetermined area for irrigation purposes and the like. A reel member is carried on the frame member and connected to the rotatable nozzle member by a drive mechanism for reeling in the cable thereby pulling the winch over the predetermined path. A clutch mechanism is included between the rotatable nozzle member and the reel to disengage and engage as desired the drive mechanism with the reel.

19 Claims, 6 Drawing Figures

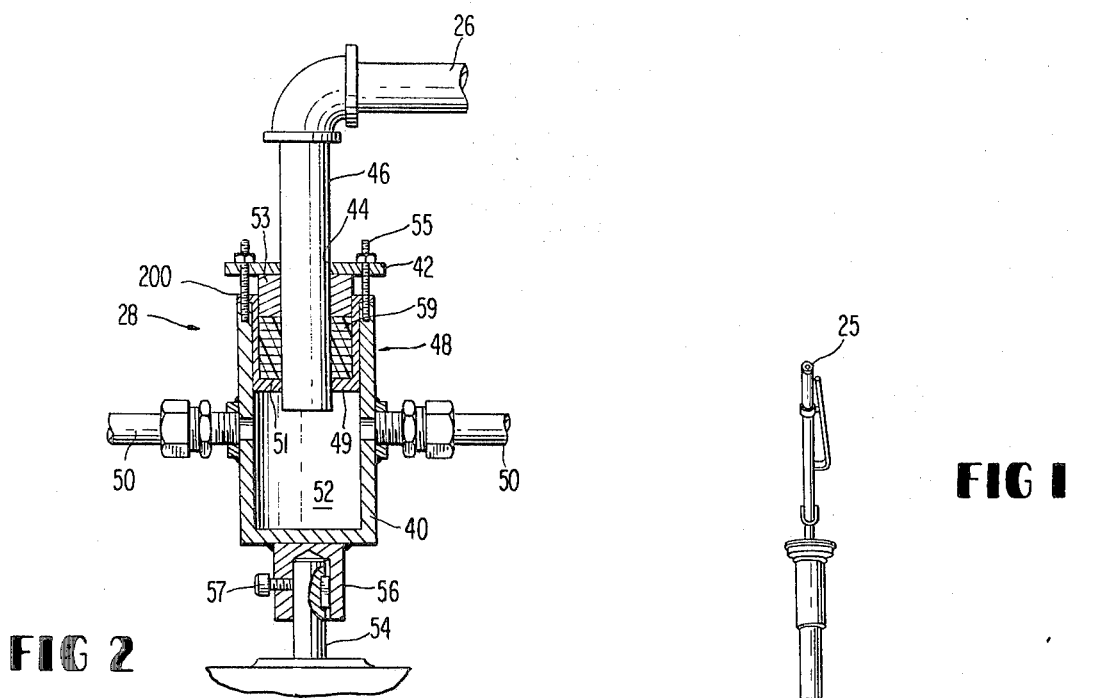
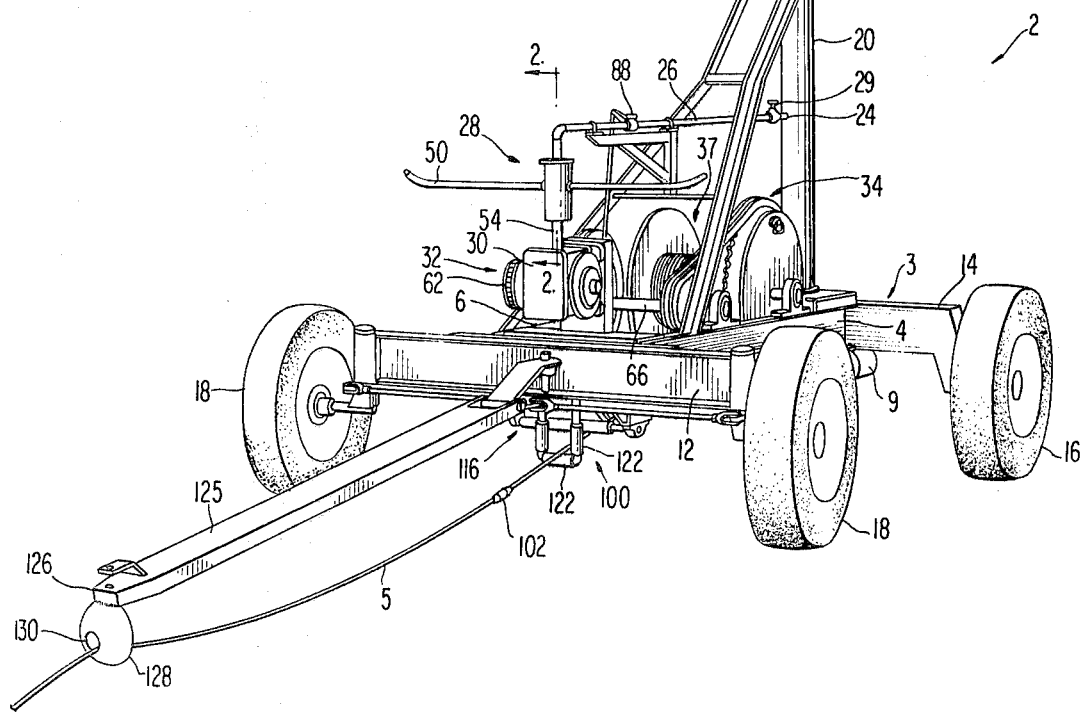

SPINNER TYPE WATER WINCH

The present invention relates to an irrigative system known as a water winch and more particularly to a drive system for a self-propelled water which.

One type of irrigation system used in irrigating agricultural lands has been the traveling water winch. With this type of system typically the winch includes a frame supported by wheels and carrying a reel for reeling in a cable which has one end connected to a post at a predetermined location in the area to be irrigated. The winch system includes a water source under pressure and a water distribution system for spraying the water over a predetermined area as the winch is being drawn toward the post. To obtain the movement of the water winch toward the post, a reel is carried on the frame and rotated by a power means which, particularly recently, has included turbine and other relatively sophisticated motor mechanisms. An example of the kind of complexity which has tended to characterize these types of irrigation systems is shown in the U.S. Pat. to Diggs, No. 3,489,352. In the Diggs patent there is shown a moving irrigation system which includes an output shaft of a prime mover connected through a gear reduction system to a drum adapted to wind a cable thereon. The prime mover, however, is a turbine means including vanes and turbine wheel secured within a body portion. The vanes impart spin to the fluid which then is directed to the turbine wheel causing rotation of the turbine wheel and the attached output shaft. The fluid then passes upwardly through a tubular member and out through the attached sprinkler.

Of course, such turbo machinery includes a high degree of sophistication and maintenance to insure that it operates properly and continuously during the life of the system. Those skilled in the turbo machinery art are familiar with the kind of tolerances required in maintaining efficiently operative interaction between the vanes and turbine. The use of such machinery often raises the cost of the system and increases "downtime" to maintain the system in proper working order.

Other systems which have characterized the prior art are shown, for example, in the U.S. Pat. to Jones, No. 1,658,202. The Jones patent is directed to a sprinkler apparatus which employs a rotating shaft as shown in FIG. 15 with a worm wheel to drive a cable drum. This system also employs a shut-off valve as described in connection with FIGS. 2 through 5 which incorporates an enlarged member for engaging a stop-eye which is connected through a rod and lever mechanism to close a valve which in turn shuts off the water supply to stop the system. In addition, the Jones device, as shown in his patent, includes a rather complicated clutch for transferring power from a sprocket to the drum side disc of the drum for reeling in the cable. Another patent of interest in this regard is the U.S. Pat. to Buckner, No. 2,013,233, which also relates to a traveling sprinkler. In referring to FIG. 3 of this patent, there is shown a vertical pin 33 which, when raised, allows a drum to be driven for reeling in the cable; when the pin is lowered, the gear which otherwise would engage the pin turns free of the drum.

The problem characterizing many of the systems above is the complexity and sophistication required in these systems which increases their cost as a capital investment and requires increased maintenance and lengthened downtime, all adding to the overall cost of using such a unit. With the subject invention, problems such as these have been minimized, and an irrigation unit has been obtained which operates more efficiently with less capital expense and less downtime.

The invention relates to a water which for spraying water over a terrain to be irrigated. The water which includes a frame member supported on wheels for easy movement across the terrain. A rotatable sprinkler system is mounted on the frame and connected to a source of water under pressure. As the water is sprayed from impulse arms extending from the body of the sprinkler, a sprinkler shaft rotates to power a drive system for the water winch. The drive system may include a reducing gear box, one or more sprocket and chain drive linkages, and a reel member. The reel member is rotatably mounted on the frame and is driven by the sprinkler system shaft to reel in a cable and thereby propel the water winch over a predetermined path defined by the cable. A clutch mechanism is integrated with the reel to engage and disengage the driving motion of the rotatable sprinkler.

The invention also includes certain additional features. A rotatable nozzle is mounted on top of a telescoping barrel which is mounted on the frame and is connected to a water source in a manner which permits delivery of the water under pressure to the nozzle to permit wide area spraying. The height of the telescoping nozzle may be adjusted as desired to control the spray area.

The sprinkler system may include a housing defining a pressure chamber into which a sprinkler supply line is connected through a packing fitting which permits the housing to maintain water under pressure substantially without leakage and also permits the housing to rotate with respect to the supply line. Extending from the housing are one or more sprinkler arms which each have nozzles on their distal ends extending substantially perpendicular to the axis of the sprinkler arm and directed so that when the water passes from the pressure chamber through the nozzle, the housing will rotate. The housing may be affixed to a shaft of a gear reduction assembly so that when the housing turns under the influence of the impulse sprinkler system, the shaft will turn.

This shaft may be connected to the cable reel through a transmission means which may include one or more sprocket and chain linkages which drives a main rotating sprocket. This main rotating sprocket is freely rotatable on a shaft which also supports the take-up reel and a clutch mechanism. The clutch mechanism may be used to lock the reel to the main sprocket wheel by means of one or more clutch pins.

When the cable is being unwound from the reel, the clutch is disengaged so that the sprinkler mechanism will not operate. A drag brake may be provided on the reel to prevent "free wheeling" of the reel when the cable is being paid out.

An automatic shutoff means may be provided by means of a linkage between a sprinkler system shutoff valve and the cable, so that when the cable has been reeled-in, the sprinkler system and its attendant driven mechanisms will shut off.

The water winch machine of the subject invention is relatively simple in design with very few moving parts to wear out. This simplicity of design, without loss of efficiency, results in a machine which is economically more acceptable for use in various irrigation systems across the country. However, like the more complex and sophisticated systems which have existed heretofore, the water winch of the present invention is self-operating, requiring manpower only when being moved from one location to another.

Advantageously, the water winch of the present invention propels itself forward at a predetermined rate as an integral part of a fluid, e.g., water, spraying system to irrigate, e.g., spray fluid on, a desired area, and then can shut down automatically when the end of a desired path has been reached. Adjustments are advantageously provided in the machine to allow the water-spraying system to go faster or slower as desired. Similarly, the pressure can be adjusted to control the amount of water being sprayed as well as the movement of the machine.

Other features and advantages of this invention will become apparent from the following description of certain embodiments thereof, taken in conjunction with the following drawings, in which:

FIG. 1 shows a perspective view of the water winch.

FIG. 2 is a cross-section of the sprinkler assembly taken along lines 2—2 in FIG. 1.

Figure 6:
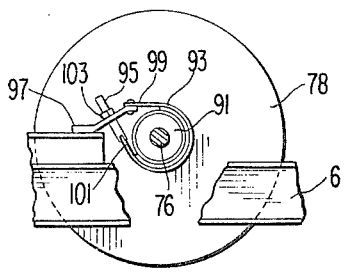
FIG. 6 is a partial side view of the water winch showing the brake mechanism for controlling reel rotation.

The water winch 2 is generally shown in FIG. 1 in its entirety. A frame 3 provides the support for the operative apparatus which allows the water winch to perform its irrigating functions. This frame 3 includes a first channel member 4 and a second channel member 6 of equal length. Each of the channel members 4, 6 extend substantially parallel to the other in a horizontal spaced relationship. A rear portion 8 of the frame 3 includes a rear cross member 14 secured to ends of the first and second channel members 4, 6 for holding the channel members in the spaced relationship and supporting the rear wheels 16 as shown. Similarly, front portion 10 includes a front cross member 12 again secured to front ends of the first and second channel members 4, 6 for additionally holding the channel members in a spaced relationship as well as supporting the front wheels 18. Also, extending from the rear portion 8 is a telescoping barrel 20 which extends vertically from the plane defined by the channel members 4, 6. A quick-connect coupling 9 communicates with the bottom of the telescoping barrel 20 to provide a means for attaching the barrel 20 to a fluid pressure source. Fixed to the top of the barrel is a spray nozzle 25 for spraying water under pressure over the area to be irrigated. A bleed pressure line 26 has one end fluidly connected to the barrel 20 at connection 24 and has its other end connected to sprinkler system 28 for supplying bleed fluid under pressure to the sprinkler system 28, located adjacent the front portion 10 of the water winch 2.

The sprinkler system 28 includes an impulse type turbine system having nozzles whereby the expulsion of the pressurized fluid from nozzles on the sprinkler will cause a portion of it to rotate. The rotation of the sprinkler system 28 is transformed into a drive motion through gear reduction assembly 30 to a first sprocket assembly 32. A second sprocket assembly 34 is connected to the first sprocket assembly and integrated with a clutch mechanism 36 to drive a reel assembly 37.

In this manner, with the above-described apparatus, when the clutch mechanism 36 is in the operative mode, the pressurized bleed fluid in rotating the sprinkler system provides the power to ultimately drive the reel assembly 37 through the gear reduction mechanism 30 and the sprocket assemblies 32 and 34 for moving the water winch along a predetermined path as defined by a previously-laid cable 5. Typically, cable 5 has one end secured to a stake (not shown) in the ground with the other end attached to the reel assembly. As the pressurized fluid is supplied to the sprinkler, the reel assembly is slowly rotated to reel in cable 5 thereby pulling the winch toward the stake along the path defined by the cable. During this movement the water supply to the sprinkler and the spray nozzle is sprayed over the area desired to be irrigated.

The above has been a general description of the operation of the preferred embodiment of the invention. The following will be a more detailed description of various subassemblies which comprise the water winch and allow it to operate as described.

As can be seen in FIG. 2, the sprinkler assembly 28 includes a generally cylindrical housing 40 having a closed bottom and an open top covered by disc 42 which has an orifice 44 therethrough for receiving a vertical portion 46 of the pressure line 26. Between the inside wall of cylindrical housing 40 and the vertical portion 46 there is provided packing means 48 for sealing the vertical portion 46 of the pressure line 26 in fluid communication with the remainder of the housing. In this way, water under pressure is provided to the housing substantially without leakage as the housing is rotated about this vertical portion 46.

The packing means 48 includes a brass packing gland 49 having a lower cup-shaped portion 51 and an upper ram portion 53. The lower cup-shaped portion 51 fits slidingly inside the open end of housing 40 and includes an outwardly extending flange 200 which rests against the circumference of the housing 40. Vertical portion 46 fits slidingly through an opening in the bottom of cup-shaped portion 51. As shown in FIG. 2, cup-shaped portion 51 receives ⅜ inch "Teflon" packing 59. Upper ram portion 53 fits slidingly inside cup-shaped portion 51. The disc 42 is secured by two stainless steel studs 55 to the casing 40 such that turning down of the studs 55 engages the disc 42 with the upper portion 53 to press it against the "Teflon" packing 59. ("Teflon" is a trademark of E. I. duPont.) Forcing the ram 53 into cup-shaped portion compresses the packing and forces the cup-shaped portion 51 tightly against the inside of housing 40 to provide a seal. The Teflon packing is also compressed against vertical portion 46 to provide a seal, however, the housing is permitted to rotate with respect to vertical portion 46.

Extending radially from the side walls of the housing 40 are two sprinkler arms 50 each of which has a distal end or elbow 50a and 50b (see FIG. 3) extending substantially perpendicularly from the ends of the arms 50 but in opposite directions to each other to create the impulse type turbine. The other ends of these arms are in fluid communication with pressure chamber 52. As a result, the water under pressure delivered from the vertical portion 46 of the pressure line 26 is forced from the pressure chamber 52 through the arms 50 causing the entire housing to rotate about an axis defined by the vertical portion 46. Extending from the bottom portion of the housing is a collar 56 having a set screw 57 for receiving a shaft 54 which is integrated with the gear reduction system 30 to reduce the number of revolutions per minute to be transferred ultimately to the reel. Instead of a set screw 57 other means like cooperating splines or keyways may be used to fix housing 40 to shaft 54. In this manner, the sprinkler itself may have several revolutions before the reel system has even one revolution. With this gear reduction system, the area for irrigation can receive a substantial amount of water before the water winch 2 is pulled out of that area by movement of the reel assembly 37 as it winds the laid cable.

To drive the reel assembly 37, one end of a drive shaft 60 extending from the gear reduction system 30 is secured to a drive sprocket 62 which in turn is drivingly connected to a larger sprocket 64 by the chain 63. A cross shaft 66 is rotatably mounted on channel members 4 and 6 by means of journal bearings 61 while having one end fixed to the smaller transfer sprocket 68 and the other end fixed to the larger sprocket 64. The transfer sprocket 68 in turn is drivingly connected to a larger main sprocket wheel 70 and clutch mechanism 36 through another chain 69. In this manner, rotation of the drive sprocket 62 by the sprinkler assembly 28 through the gear reduction system 30 ultimately drives main sprocket wheel 70 at a reduced number of revolutions per minute (rpm). Furthermore, the chain and sprocket system is one which is dependable and requires little maintenance.

To place the reel assembly in operation, a clutch system is employed for connecting the driving torque of the sprocket 70 to the reel 72. The clutch system allows the sprocket 70 to rotate independently of the reel 72 until the clutch system is actuated to connect them. Similarly, when laying the cable, the cable can be paid out from the reel without moving the chain and sprocket system. Thus, when the winch is being moved to a new position, the chain and sprocket system is not in motion, thereby reducing wear significantly.

Figure 4:
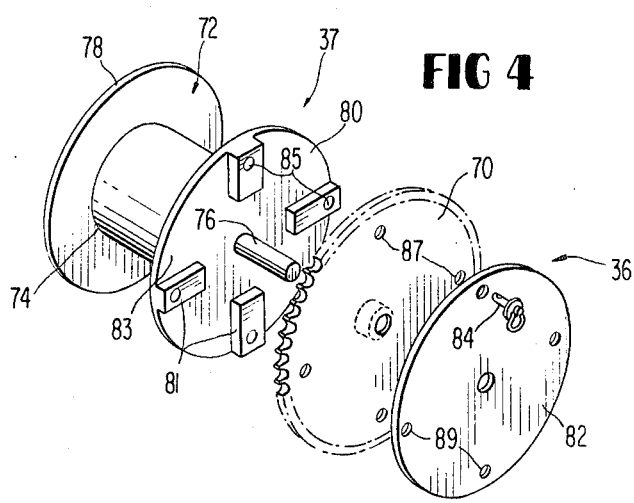
FIG. 4 is an exploded perspective view of the clutch assembly.

The reel assembly 37, as best shown in FIG. 4, includes the reel 72 comprised of a reel drum cylinder 74 fixed to shaft 76. Attached at each end of the reel drum cylinder 74 are circular plates: a first reel plate 78 and a second plate 80, each extending substantially perpendicular to the axis of rotation for the reel cylinder 74. These reel plates 78, 80 are attached to the reel drum cylinder 74 to rotate with the reel drum cylinder 74 and shaft 76. Spaced from the second reel plate 80 is a third plate 82 which is parallel to the second reel plate 80 and also fixed to the shaft 76. The sprocket 70 on the other hand is rotatably secured to the shaft 76 and is located intermediate the second reel plate 80 and third plate 82 such that rotation of the sprocket 70 can be accomplished independently of the reel assembly 37 and the third plate 82.

A clutch pin 84 is provided for interaction with the third plate 82 and the second plate 80 to lock these two plates 82 and 80 together in a clutch-like disposition whereby movement of the sprocket 70 will cause rotation of the third plate 82.

Figure 3:
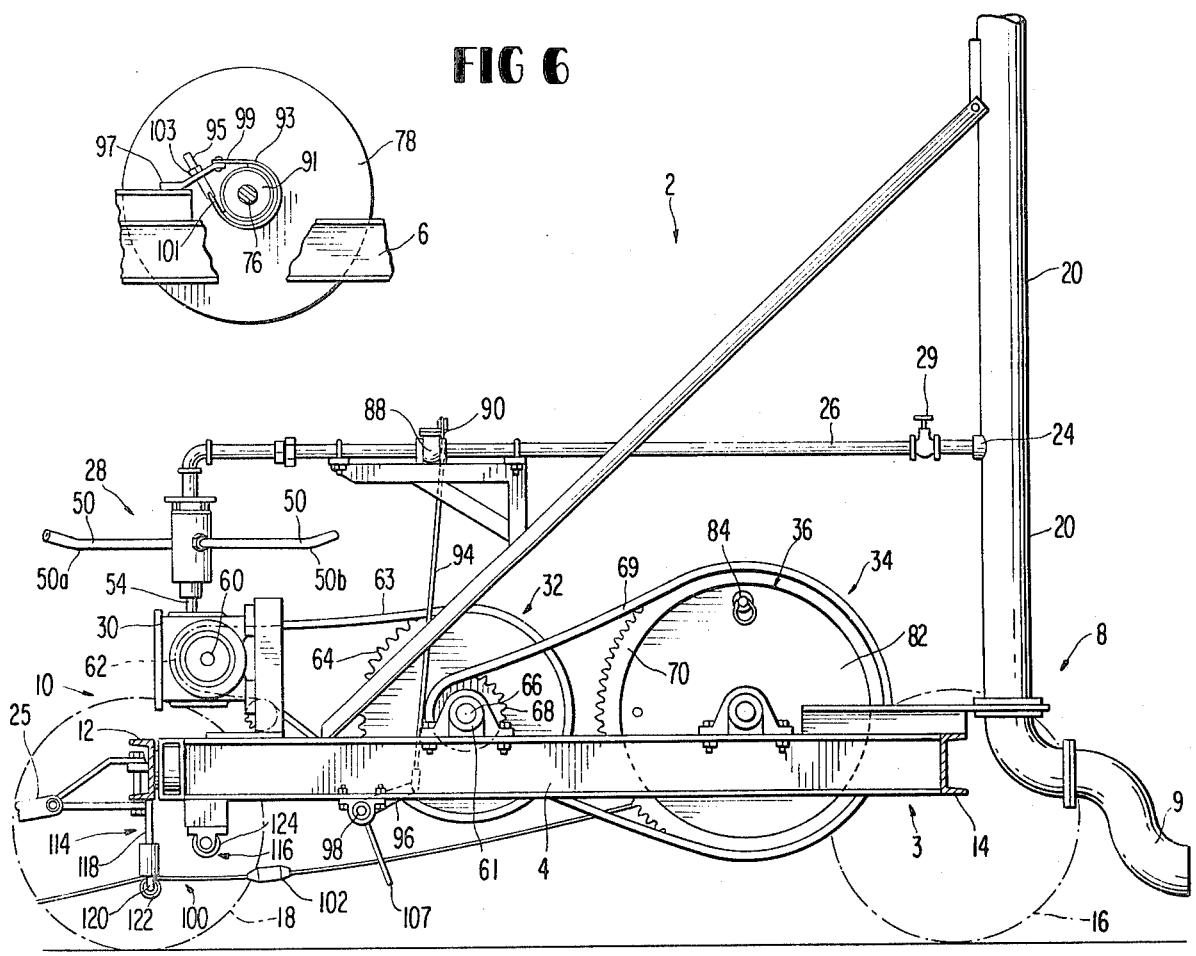
FIG. 3 is a partial elevation view shown partly in section of the water winch of FIG. 1.

The second reel plate 80 is provided with receptacles for engaging the clutch pin 84. Four equally spaced bosses 81 are secured to surface 83 of the plate 80 facing the sprocket 70. Each boss 81 has a locking pinhole 85 therein to receive the clutch pin 84. The sprocket 70 has four equally spaced sprocket pinholes 87 extending entirely therethrough and registerable with the locking pinholes 85 in bosses 81. Similarly, the third plate has pinholes 89 therethrough which register with both the sprocket pin receiving holes 87 and the locking pin receiving holes 89. In this manner, when the holes 85, 87, 89 are aligned, the clutch pin 84 may be inserted to the engaged position, as shown in FIG. 3, for connecting the sprocket 70 to the plates 80,82.

In the engaged position, the clutch pin 84 will transfer rotation of the sprocket 70 to the second reel plate 80, thus causing rotation of the reel 72. When the pin is withdrawn, the rotative motion of the sprocket 70 will not be transferred to the reel 72. Rather, sprocket 70 will merely be rotated independently of the reel 72. In this way, the clutch pin 84 provides a relatively simple and efficient clutch mechanism for engaging the rotative motion of the sprocket to the reel 72.

A brake system, as shown in FIG. 6, is provided to impart sufficient drag to the reel 72 for preventing "freewheeling" during the paying and retrieving operations. Specifically, the brake system includes a brake drum 91 extending from plate 78 concentrically with the axis of rotation of the reel 72. A brake band 93 with an adjusting rod 95 is secured about the drum 91 and adjustably fixed to bracket 97. One end 99 of the band 93 is fixed to bracket 97, but the other end 101 having the rod 95 is adjustably secured to the bracket 97 by adjusting nut 103 threadedly engaged with rod 95. With this configuration, turning down of the adjusting nut 103 on the rod 95 draws the band more tightly about the drum to increase the drag on the reel 72. Reversing the adjusting nut 103, of course, has the opposite effect.

In laying and retrieving the cable, one end of the cable is fixed to the reel 72, and the other end is fixed to a stake at a predetermined position on the area to be irrigated. The water which system 2 is then simply moved to a desired position displaced from the stake. When moving the winch, the water source is either not attached to the telescoping barrel 20 or it can be attached but with the control valve in an off position such that the water pressure is not delivered to the sprinkler system 28. As a result, the only thing that will move is the reel itself as the cable is being paid off the reel 72 during movement of the winch away from the stake. Once the water winch 2 is in position to initiate irrigation, the control valve is opened allowing the desired pressure to be delivered to the sprinkler system 28 ultimately resulting in turning of the reel 72 and winding the cable thereabout. As explained above, this will pull the water winch 2 over the path defined by the cable and toward the stake, irrigating the surrounding area to the water winch.

Figure 5:
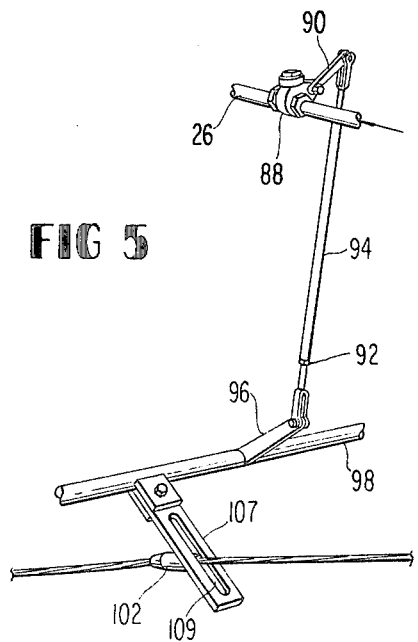
FIG. 5 is a perspective view of the automatic shut-off system in the closed position.

An automatic shut-off mechanism is provided in conjunction with the bleed pressure line 26 to shut the water pressure to the sprinkler system when the water winch 2 has reached the end of its path. With reference to FIGS. 1, 3 and 5, this system includes a valve shut-off 88 which is integrated with the pressure line 26 between the sprinkler system 28 and a manual control valve 29 located downstream of connection 24. A valve actuator or lever 90 in the open position as shown in FIG. 3 is automatically actuated by a series of rods and levers to be explained hereinafter to shut the pressure to the remainder of the system. This mechanism includes an adjustable rod 94 which has one end rotatably secured to the actuator 90 and the other end threadably fixed to adjusting bolt 92 which in turn is rotatably attached to one end of link 96. With this configuration, the operator can adjust the mechanism to insure that the valve 88 will be moved to an off position when properly actuated.

A mechanism is provided for moving the adjusting rod 94 and ultimately actuator 90 to the off position when the winch has reached the end of its path. This mechanism includes the link 96 being secured to a positioning shaft 98 extending from the channel member 4 of the frame. Spaced from link 96 and extending downwardly from shaft 98 is a slotted lever 107 having a slot 109 to allow pressure therethrough of the cable during paying and retrieving. Fixed on the cable, at a location typically adjacent the stake, is a stop member 102 of sufficient effective diameter to prevent its movement through the slot 109. As the cable is reeled in, the stop member 102 will eventually engage the slotted lever 107 causing it to rotate. This results in corresponding rotation of the shaft 98 and link 96; accordingly, rod 94 will move upward vertically and rotate the valve actuator 90 to the off position thereby shutting pressure off to the sprinkler system 28. In this way, a relatively simple and efficient shut-off valve system is provided for the winch 2.

To insure that the cable does not become entangled with other parts of the winch, a cable guide assembly 100 is incorporated with the other elements of the winch to maintain the cable with a predetermined area. As shown in FIGS. 1 and 3, this guide assembly includes a U-bar 114 and a cross-bar 116 located on the winch 2 beneath the channel members 4, 6 and in front of the slotted lever 107. The U-bar 114 has two vertical legs 118 spaced apart and connected at one end by bottom member 120. The other end of the vertical legs 118 are attached to an underside of a cross-member 12. Both the vertical legs 118 and the bottom member 120 have sleeves 122 rotatably secured thereto. The cross bar 116 is rotatably secured to channel members 4, 6 adjacent the U-bar 114 between it and the shaft 98 and supports a roll cable guide bar 124. The guide bar 124 is spaced above the bottom member 120 to provide a square cross-section of open area for the cable. The guide bar 124 has its ends journalled on bearings to facilitate rotation caused by the cable bearing on the bar 124 as it is wound upon the winch. Both the sleeves 122 and the guide bar 124 enhance the movement of the cable when it is bearing upon one or both of them. This reduces wear on the cable as well as other parts of the winch 2. Particularly because the axis of the guide bar 124 is located below and forwardly the axis of the reel 72, the cable will bear continuously on the guide 124 as it is reeled in. The rotation of the guide bar 124 with the movement of the cable eliminates the frictional wear which would otherwise occur.

A transport arm 125 extends from the front portion of the winch and carries at its distal end 126 a cable guide grommet 128 to guide the winch 2 during its movement over the terrain. The grommet 128 has an opening 130 larger than the cable and the stop member 102 to allow easy passage therethrough. With this configuration, the arm 125 with its grommet 128 tends to keep the winch moving along the path defined by the previously laid cable as the cable is retrieved by the reel 72.

Although a multitude of various apparatus is available for achieving the above-described configurations, the present embodiment has employed the following elements. For example, the housing for sprinkler system 28 is of ¼ inch thick walls with a 1 inch stainless line coming through a brass packing gland. The pressure of the fluid typically used in this system is about 70 lbs. pressure, psig. Fluid under this pressure travels through the two ¾ inch stainless steel spinner arms which have 90° turns at each end with brass plugs therein. The brass plugs have ¼ inch holes drilled in each. The gear reduction is the standard Browning speed reducing gear box with a 50-1 gear ratio reduction. The first sprocket assembly, located on the left-hand side of the gear box is an 80-Q-17 sprocket which is attached on the right side of the water winch 2 adjacent the channel member 4 also on the cross shaft 66. The main sprocket wheel 70, driven by a chain engaged with the intermediate sprocket 68, is an 80-Q-84 sprocket with a 2 inch bore secured to the shaft 76. The cable used in this system is a standard ⅜ inch cable although other size cables may be conveniently used.

With this configuration it has been found that the water winch is one which is reliable and can be used efficiently with a great reduction of "downtime".

It will now be appreciated that the water winch of the present invention propels itself forward at a predetermined rate along a prescribed path employing a drive system that is an integral part of a fluid spraying apparatus and then can shut down automatically at the end of the path. The spraying system includes a telescoping barrel on which a spray nozzle is mounted and may be raised or lowered to control the spray area. A portion of the source water that is sprayed by the water winch is diverted to a sprinkler system mounted on the water winch. The sprinkler system has an impulse type rotating sprinkler whose rotary motion is harnessed to reel in a previously laid cable and thereby, propel the water winch along a predetermined path defined by the cable. The water expelled by the sprinkler system is also used to provide irrigation along the path traveled by the water winch.

Although the present invention has been disclosed with reference to certain preferred embodiments, numerous modifications and variations could be made within the scope of the present invention. Hence, my invention should not be and is not intended to be limited to the disclosure of these preferred embodiments but is limited only as specified in the attached claims.

It is claimed:

1. A water winch for delivering water under pressure to a predetermined area while moving over a terrain to irrigate the area comprising:
   (a) a frame having wheel means allowing movement of the frame across the terrain to be irrigated;
   (b) a rotatable nozzle connectible to a water source for delivering water under pressure thereto;
   (c) a reel for reeling in a cable rotatably mounted on said frame;
   (d) drive means connecting said rotatable nozzle to said reel for rotating said reel to reel in said cable for moving said water winch over a predetermined path defined by said cable;
   (e) said drive means including a shaft supporting said reel, a rotatable member fixed to said shaft and spaced from said reel, chain and sprocket means including a main sprocket mounted on said shaft between said reel and said rotatable member, and a clutch pin engageable with said reel, said rotatable member and said sprocket.

2. The water winch according to claim 1 wherein:
   (a) said reel has a recess therein;
   (b) said rotatable member and said main sprocket each has an aperture therein; and
   (c) said recess and said apertures are alignable for receiving said clutch pin.

3. The water winch according to claim 2 wherein said reel includes a cylindrical drum rotatably secured about said shaft and a reel plate extending substantially perpendicular to said shaft and fixedly secured to said drum, and said recess is provided in said reel plate.

4. The water winch according to claim 3 wherein said reel plate includes a plurality of equally spaced recesses, and said rotatable member and said main sprocket each have a plurality of apertures therein, said apertures being alignable with said recesses.

5. The water winch according to claim 1 wherein said drive means further includes a gear reduction assembly having an input shaft fixed to said rotatable nozzle and having an output shaft which rotates at a predetermined reduced speed and said chain and sprocket means is connected to said output shaft to drive said reel at a predetermined rate of rotation.

6. The water winch according to claim 5 wherein said chain and sprocket means includes a first sprocket assembly and a second sprocket assembly displaced transversely from said first sprocket assembly, said first sprocket assembly having a drive sprocket driven by said gear reduction assembly and a driven sprocket driven by said drive sprocket, said driven sprocket having a transverse shaft extending therefrom, said second sprocket assembly having an intermediate sprocket attached to said transverse shaft, whereby rotation of said driven sprocket causes corresponding rotation of said intermediate sprocket, said main sprocket being drivingly connected with said intermediate sprocket for driving said reel.

7. The water winch according to claims 1, 2, 3, 5 or 6 further comprising an automatic shut-off means including, a valve controlling flow of water to said rotatable nozzle, valve actuator means for moving said valve between an open position and a closed position, and a stop carried by said cable to actuate said valve actuator means when said winch reaches a predetermined position for moving said valve to its closed position.

8. The apparatus of claim 1 and further including a generally cylindrical housing mounted for rotation about its axis and supporting said rotatable nozzle;
an input pipe connectible to the water source and extending into said housing; and
packing means sealingly disposed between a wall of said housing and said input pipe, said housing and said packing means defining a pressure chamber, said packing means including a cup-shaped member, packing disposed in said cup-shaped member and surrounding said pipe, and adjustable means engaging said packing for compressing said packing tightly against said pipe and said wall of said housing.

9. The water winch according to claim 1 and further comprising:
(a) guide means for maintaining the cable within a predetermined area when said cable is being reeled in by said reel;
(b) said guide means including a U-shaped bar member having a bottom member and two spaced vertical legs extending therefrom and secured to said frame;
(c) said guide means further including a crossbar spaced from said U-shaped bar member substantially parallel to said bottom member to form a bearing surface for said cable opposed to said bottom member, said crossbar being journalled to said frame for rotation relative thereto intermediate said U-shaped bar member and said reel;
(d) said reel being disposed adjacent the rear portion of said frame and said U-shaped bar member being disposed adjacent the front portion of said frame.

10. A water winch for delivering water under pressure to a predetermined area while moving over a terrain to irrigate the area comprising:
(a) a frame having wheel means allowing movement of the frame across the terrain to be irrigated;
(b) a rotatable nozzle connectible to a water source for delivering water under pressure thereto;
(c) a reel for reeling in a cable rotatably mounted on said frame;
(d) drive means connecting said rotatable nozzle to said reel for rotating said reel to reel in said cable for moving said water winch over a predetermined path defined by said cable;
(e) said drive means including a clutch pin engageable with said reel; and
(f) an automatic shut-off means including a valve controlling flow of water to said rotatable nozzle, valve actuator means for moving said valve between an open position and a closed position, and a stop carried by said cable to actuate said valve actuator means when said winch reaches a predetermined position for moving said valve to its closed position;
(g) said valve actuator means including a first lever for moving said valve between said open position and said closed position, a second lever engageable by said stop, and a rod connected to one end to said first lever and at the other end to said second lever.

11. The water winch according to claim 10 further including brake means for controlling the drag on said reel as said cable is reeled in and paid out.

12. The water winch according to claim 11 wherein said brake means includes a brake drum, a brake band circumscribing said drum for frictional engagement with said drum, said brake band being adjustably secured to said frame for adjustably controlling the engagement of said band with said drum.

13. A water winch for delivering water under pressure to a predetermined area while moving over terrain for irrigating the predetermined area comprising:
(a) a frame having wheel means allowing movement of the frame across the terrain to be irrigated;
(b) a rotatable nozzle connected to a source for delivering water under pressure to said nozzle;
(c) a reel for reeling in a cable rotatably mounted on said frame;
(d) drive means connecting said rotatable nozzle to said reel for rotating said reel to reel in said cable to move said water winch over a predetermined path defined by said cable;
(e) a conduit for connecting said water source with said rotatable nozzle, said conduit having a valve located thereon intermediate said source and said nozzle, said valve having a valve lever movable between an open position for allowing water under pressure to be delivered to said rotatable nozzle and a closed position for preventing water under pressure from being delivered to said rotatable nozzle;
(f) an automatic shut-off means for moving said valve lever to the closed position including a shaft rotatable secured to said frame, a first lever extending from said shaft and having a cable opening therethrough, said cable carrying a stop having an effective diameter greater than said cable opening for engaging said first lever and rotating said first lever, said cable opening have an effective diameter larger than that of said cable to allow passage of said cable, connecting means secured to said valve lever and said first lever for moving said valve lever to a closed position upon engagement of said stop with said first lever and rotation of said first lever.

14. The water winch according to claim 13 wherein said connecting means includes a second lever extending from said rotatable shaft and a rod having one end secured to said second lever and its other end secured to said valve lever.

15. The water winch according to claim 14 further comprising guide means for maintaining the cable within a predetermined area when the cable is being reeled in by said reel.

16. The water winch according to claim 15 wherein said guide means includes a U-shaped bar having a bottom member with two spaced vertical legs extending therefrom and secured to said frame.

17. The water winch according to claim 16 wherein said guide means further comprises a crossbar spaced from said U-shaped bar member substantially parallel to said bottom member to form a bearing surface for said cable opposed to said bottom member.

18. The water winch according to claim 17 wherein said crossbar is journalled to said frame for rotation therewith relative thereto intermediate said U-shaped bar and said reel.

19. The water winch according to claim 18 wherein said frame has a front portion and a rear portion, said reel being located adjacent said rear portion, said U-shaped bar being secured beneath said frame and adjacent said front portion, and said crossbar being located vertically above said bottom member.

* * * * *

UNITED STATES PATENT AND TRADEMARK OFFICE
CERTIFICATE OF CORRECTION

PATENT NO. : 4,248,382
DATED : February 3, 1981
INVENTOR(S) : J. Jearl Moore

It is certified that error appears in the above—identified patent and that said Letters Patent is hereby corrected as shown below:

Column 1, line 6, after "water" delete "which" and substitute --winch--.

Column 2, line 5, after "water" delete "which" and substitute --winch--.

Column 2, line 6, after "The water" delete "which" and substitute --winch--.

Column 2, line 61, after "attendant" delete "driven" and substitute --drive--.

Column 10, line 32, after "connected" delete "to" and substitute --at--.

Signed and Sealed this

Twenty-fourth Day of November 1981

[SEAL]

Attest:

GERALD J. MOSSINGHOFF

Attesting Officer    Commissioner of Patents and Trademarks